United States Patent
Wen et al.

(10) Patent No.: US 12,465,856 B2
(45) Date of Patent: Nov. 11, 2025

(54) OBJECT MOTION WITHIN A VIDEO GAME

(71) Applicant: Electronic Arts Inc., Redwood City, CA (US)

(72) Inventors: Yangming Wen, Newark, CA (US); Yichi Zhang, Fremont, CA (US); Harold Henry Chaput, Castro Valley, CA (US)

(73) Assignee: Electronic Arts Inc., Redwood City, CA (US)

( * ) Notice: Subject to any disclaimer, the term of this patent is extended or adjusted under 35 U.S.C. 154(b) by 345 days.

(21) Appl. No.: 18/191,694

(22) Filed: Mar. 28, 2023

(65) Prior Publication Data
US 2024/0325915 A1     Oct. 3, 2024

(51) Int. Cl.
*A63F 13/573*   (2014.01)
*A63F 13/67*    (2014.01)
*G06T 7/20*     (2017.01)

(52) U.S. Cl.
CPC .............. *A63F 13/573* (2014.09); *G06T 7/20* (2013.01); *A63F 13/67* (2014.09); *G06T 2207/10016* (2013.01); *G06T 2207/20081* (2013.01); *G06T 2207/30241* (2013.01)

(58) Field of Classification Search
CPC .......... A63F 13/573; A63F 13/67; G06T 7/20; G06T 2207/10016; G06T 2207/20081; G06T 2207/30241
See application file for complete search history.

(56) References Cited

U.S. PATENT DOCUMENTS

| | | | | |
|---|---|---|---|---|
| 8,033,914 B2* | 10/2011 | Yoshikawa | ............. | A63F 13/26 463/31 |
| 2008/0171595 A1* | 7/2008 | Nakasaka | ............... | A63F 13/42 463/31 |

OTHER PUBLICATIONS

"How To Throw a Pokeball In Pokemon Go" (Year: 2016) "https://www.youtube.com/watch?v=1DpWZgYrD4w."*

* cited by examiner

*Primary Examiner* — Reginald A Renwick
(74) *Attorney, Agent, or Firm* — Lee & Hayes, P.C.

(57) ABSTRACT

A video game system and method analyze virtual contact between an avatar and a virtual object within a video game. The point of contact of the virtual contact on the virtual object and/or the intensity of contact of the virtual contact may then be used to determine a subsequent virtual action to be performed within the video game. The virtual action, with any virtual movement thereof, may be carried out in a realistic manner within the video game by determining a virtual trajectory of the motion. The virtual trajectory may be determined using a motion model. The motion model may provide the virtual trajectory of the virtual object based at least in part on one or more parameters of the virtual object, such as a weight parameter. The motion model may be trained using training video clips with realistic motion of virtual objects.

20 Claims, 7 Drawing Sheets

OBJECT MOTION WITHIN A VIDEO GAME

BACKGROUND

Video games, including online hosted video games, allow a player of the game to perform virtual actions within the video game by interacting with one or more virtual objects. The player may control the virtual actions of their avatar or character within the video game. For example, a player may place a wine glass on a countertop or lay down on a bed. In some cases, the virtual object with which an avatar or character interacts may be used for a variety of different virtual actions. For example, a virtual cat may be petted or picked up by an avatar within a video game. Additionally, the depiction of a virtual action may be unrealistic in many cases. For example, in real life, a person may move a heavy object differently than how they move a light object, a fragile object, and/or a durable object. Often times, the movement of virtual objects, as part of a virtual action within a video game, may be manually orchestrated to provide real life-like movement. Such a process is time consuming and expensive when dealing with a large number of virtual objects.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
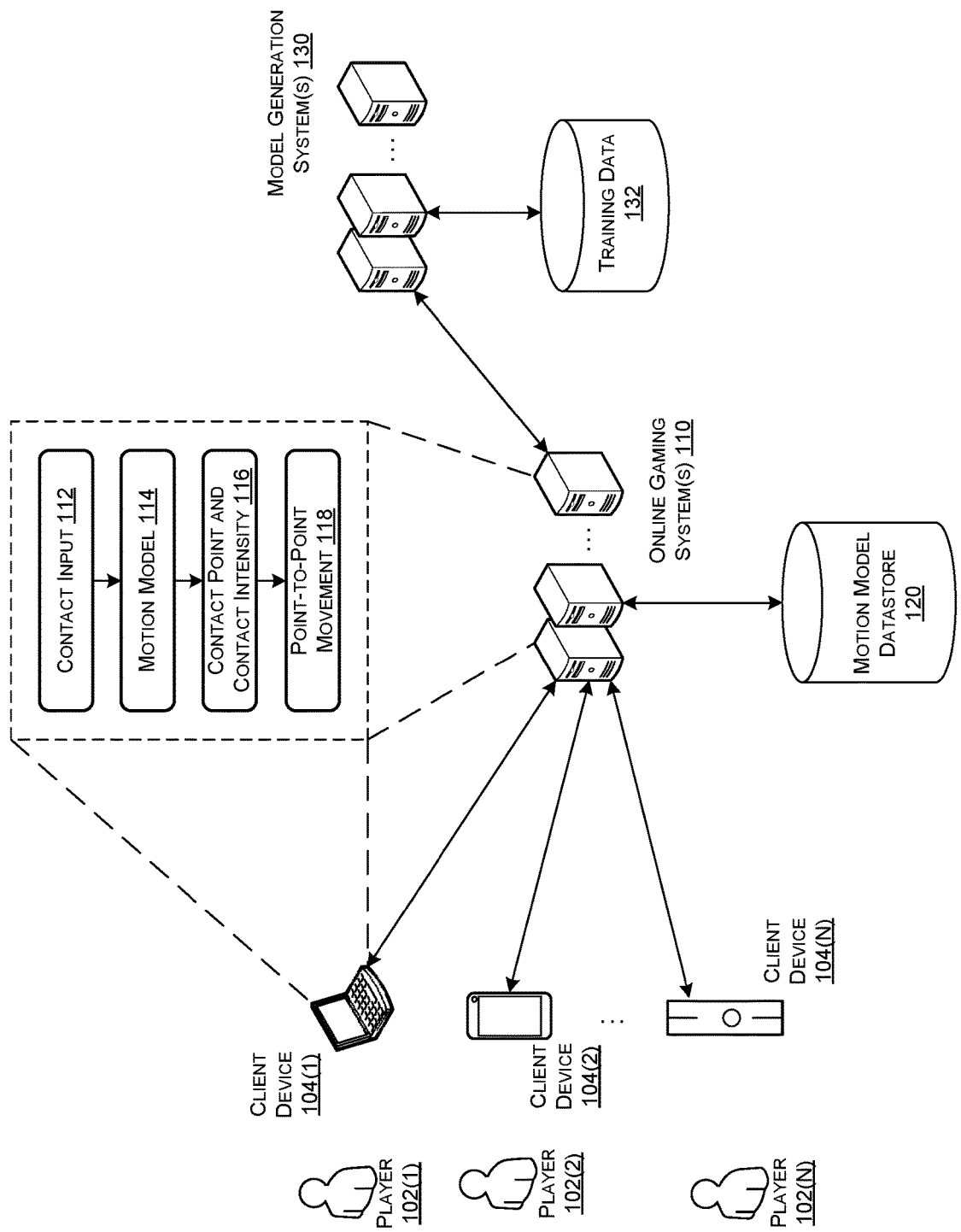
FIG. 1 illustrates a schematic diagram of an example environment with client system(s), online gaming system(s), and/or model generation system(s) to enable virtual object motion within a video game, in accordance with examples of the disclosure.

Examples of this disclosure describes methods, apparatuses, computer-readable media, and system(s) for determining a virtual action within a video game and realistically depicting motion involved in the virtual action. One or more system(s), such as a client device and/or an online gaming system, may be used to determine where and how an avatar of a player virtually touches another virtual object within the video game. The client device and/or online gaming system may identify a virtual action to be performed within the video game based at least in part on the way (virtual position and/or virtual force) with which an avatar touches the virtual object. The client device and/or the online gaming system may then use a motion model to determine the trajectory of any virtual motion involved in the virtual action to be performed between the avatar and the virtual object. "Virtual," as used herein, refers to actions, objects, characters, avatars, motion, etc. that is depicted within a video game. For example, a virtual action may be a depiction within a video game of an action that may be performed in real life. Similarly, a virtual object may be a depiction of a real-life object within a video game.

The user or player of a video game may control a character and/or avatar within the video game. This avatar may be controlled by the player, such as by using input devices, like a joystick. The player may be able to move their avatar virtually within the video game to interact with different virtual objects within the video game, such as virtual inanimate objects, virtual animals, non-playing characters within the video game, and/or other avatars of other players. The method herein may be configured to determine the nature of a contact by an avatar, as controlled by its corresponding player. The contact may be characterized by its location on the virtual object and/or its magnitude. For example, if a player is playing a virtual basketball player avatar within a basketball video game (e.g., NBA LIVE 19 by ELECTRONIC ARTS), how the virtual basketball player touches another basketball player may be used to determine a virtual action to be performed within the video game. For example, if the virtual basketball player touches another virtual player on the back, the virtual player may be celebratorily patting the other virtual player. On the other hand, if the virtual basketball player touches another virtual player in the front of that other virtual player with a relatively high level of virtual force while that virtual player is dribbling a basketball, then the virtual basketball player may draw a virtual foul. This virtual action, in the form of a virtual foul, would then be realistically enacted within the video game, according to examples of the disclosure.

As another non-limiting example of the aforementioned virtual action, consider a player, via their player account, controlling a virtual human within a simulation video game (e.g., SIMS 4 by ELECTRONIC ARTS). If the player controls the virtual human to touch a foot of a virtual bed, then according to examples of the disclosure, a virtual action of the virtual human stumping their toe against the virtual bed may be enacted. However, if the same virtual human touches the side of the same virtual bed, then the virtual action to be depicted may be that the virtual human lies down on the virtual bed. In yet another alternative, if the same virtual human touches a corner of the bed with a threshold magnitude, as determined by the user input from the player, the virtual action depicted may be of the virtual human pulling a virtual fitted bedsheet off of the virtual bed.

In yet another non-limiting example of the virtual action, consider a player, via their player account, controlling a virtual fighter in a mixed martial arts video game (e.g., UFC20 by ELECTRONIC ARTS). If the virtual fighter approaches a virtual opposing fighter from the front with a gentle force (e.g., below a threshold level of magnitude toward the virtual opposing player), then the virtual fighter may shake hands with the virtual opposing fighter, such as prior to a fight. However, if the virtual fighter approaches and contacts the opposing virtual fighter with a force (e.g., a magnitude of input movement) greater than the threshold level, then the determined action may be that the virtual fighter is to punch the opposing virtual fighter. Similar to the handshake, this virtual punch may be enacted in a realistic manner, according to this disclosure.

As discussed herein, the point of contact and/or the magnitude of contact, as input by a player controlling their avatar within the video game, may determine a virtual action to be implemented within the video game. According to examples of the disclosure, the virtual action may be depicted in a realistic way, such as by depicting virtual motion, such as motion of the avatar and/or a virtual object with which the avatar is interacting, in a manner that emulates real life. The motion model(s), as disclosed herein, allow for virtual movement to emulate real-life movement. The motion model(s) may be trained on video game clips and/or other video training clips that depicts natural movement. The motion model(s) may use one or more parameters associated with a virtual object, such as virtual weight of the virtual object, to render virtual motion that is realistic. In this way, motion and/or trajectory of every single virtual object within the video game does not need to be mapped out in a manual way. Instead, according to the motion model(s) disclosed herein, the motion and/or trajectory of a virtual object and/or avatar may be determined based on one or more parameters associated with the virtual object. In some cases, the motion model(s) may provide a trajectory that include a start point, an end point, and/or one or more waypoints associated with a virtual trajectory of motion of a virtual object within the video game.

As an example of the aforementioned realistic motion, consider how in real life, a person might place a light object (e.g., a wine glass) on a table versus placing a heavy object (e.g., a heavy shopping bag) on the same table. With respect to the wine glass, the person may move the wine glass from a start location or start point to an end location or end point on the surface of the table. The movement of the wine glass may be a relatively direct line from the start point to the end point on the table. Immediately before touching the wine glass down on the table, the person may reduce the speed of the wine glass (e.g., decelerate the wine glass) so that it may be placed gently on the table. In contrast, the person may place the heavy shopping bag on the table by swinging the shopping bag up and then down on the table, such as in a parabolic trajectory. Such a swinging/parabolic motion may be used by people in real life to use momentum to move heavy objects, where the person's shoulders, arms, elbows, wrist, etc. work as a simple machine to reduce the effort (e.g., by trading off greater distance for reduced force, with work remaining the same) in moving the shopping bag. Humans and animals often use momentum and/or other non-straight line motion to preferentially trade-off between force and distance in the movement of objects. Often times, the trajectory by which the human or animal moves an object may depend on one or more characteristics of the object being moved, such as the object's weight (e.g., relatively heavy, relatively light, etc.), the object's robustness to impact (e.g., fragility, durability, propensity to bruise, etc.), the object's deformation due to force applied (e.g., stretchability, compressibility, etc.), etc. The motion model(s), as disclosed herein, may take into account one or more parameters (e.g., weight) of a virtual object to emulate life-like motion in the video game.

Continuing with the aforementioned example in the placement of the wine glass and the heavy shopping bag, one or more motion model(s), as invoked by the client device and/or the online gaming system, may determine the trajectory of virtual motion. For example, the motion model(s) may identify and/or receive a parameter associated with a virtual wine glass (e.g., the weight of the wine glass) and then provide a relatively straight-line movement of the virtual wine glass within the video game. The virtual trajectory of the wine glass, as provided by the motion model(s) may indicate a start point, an end point, and/or one or more waypoints between the start point and the endpoint, where the waypoints define the motion of the trajectory. The motion model(s) may also provide defined motion parameter(s) (e.g., velocity, acceleration, etc.) between start points, waypoints, and/or end points. For example, the motion model(s) may indicate a relatively constant speed between the start point and each of the waypoints, except between the last few waypoints and the end point, where the speed is reduced to gently place the virtual wine glass on the virtual table, as one would in real life. In contrast, the motion model(s), based on the weight of a virtual shopping bag, may generate a trajectory, with a start point, an end point, and waypoint(s), that indicate a parabolic trajectory that one would use in real life to put a shopping bag on a table.

As another example of realistic virtual motion, consider a virtual cat that is picked up by an avatar in the form of a virtual human in a video game. The avatar may place their hands behind the front legs of the virtual cat and then start moving slowly (e.g., relatively low speed between the start point and first few waypoints) and then trace a curvilinear path, with the virtual cat and the avatar facing each other, and then slow down near the apex of where the cat may be held (e.g., relatively low speed near the last few waypoints and the end point). It should be appreciated that tracing the aforementioned trajectory (e.g., both spatially and temporally), as determined by the motion model, may appear more realistic than a straight-line, constant speed motion from the virtual cat's initial position on the floor to its final position being held by the avatar.

It should be understood that the aforementioned motion of picking up the cat may not involve any or significant human work to generate. For example, the motion model, based on its training, may be able to generate the virtual trajectory of the cat and the avatar picking up the cat. Thus, a human did not have to program or coordinate the entirety of the movement of the cat. Rather, the motion model may have been trained on other virtual objects and applied that learning to predict the realistic movements associated with picking up a cat. For example, the motion model may have been trained on the virtual trajectories employed in picking up a small dog and that learning can be employed in determining the movements in picking up a similarly sized cat.

The realistic motion generated by the motion model(s), as described herein, may not always involve a virtual object for the entirety of the virtual trajectory. For example, the motion model(s) may be used to provide realistic motion of an avatar that is to sit on a virtual couch. Like in real life, the avatar may move in front of a couch on the cushion side and turn around (e.g., butt toward the couch) and then bend in a squatting motion and then plop down on the cushion. The bending motion and the plopping motion may have trajectories determined for individual points of the avatar itself (e.g., movement of the avatar's butt, torso, etc.) by the motion model(s). Thus, in some cases, a virtual action (e.g., sitting down on a couch) may be defined by trajectories of more than one virtual element (e.g., the avatar's butt and the avatar's legs) that may move in overlapping time.

It should be understood that the mechanism, as disclosed herein, presents the advantage that the realistic motion for virtual objects may be determined automatically and without significant human intervention. In other words, the virtual motion in any virtual action and/or virtual interaction between an avatar and an object may be generated by the motion model(s) using a limited set of parameters (e.g., a weight parameter, a fragility parameter, a deformation parameter, etc.) associated with the virtual object. Thus, the process of generating the virtual motion (e.g., a defined virtual trajectory with a start point, an end point, and/or one or more intervening waypoints) may not require human intervention. Rather, the motion model(s) may generate the virtual trajectory dynamically within the video game based on its training. The motion model(s), as disclosed herein, may be deployed within a video game software running on an individual client device (e.g., video game machine) and/or deployed within a remote online video game server.

It should also be appreciated that the realistic virtual motion of virtual objects, as disclosed herein, is not just limited to avatars that are controlled by a player. The realistic virtual motion, as disclosed herein, may be applied to interactions between a non-playing character (NPC) and a virtual object, between a virtual animal and a virtual object, between two virtual objects, between any two virtual entities (controlled by a player or not controlled by a player), and/or between any number of different virtual entities within the video game.

The motion model(s) may be trained using training video clips. These video clips for training the motion model(s) may be from any suitable source. In some cases, the training video clips may be labeled training data, in that the virtual objects therein are prelabeled for the purposes of training the motion model(s). The labeled training data may be video clips from video games (e.g., the same video game for which the motion model is being trained). For example, video game clips for a simulation game (e.g., SIMS 4: PETS by ELECTRONIC ARTS), may be used to train a motion model for the simulation game. Since the video game clips are from the same video game for which the motion model is generated, the video game clips are already labeled. Labels, as used herein, refers to the virtual objects and/or virtual actions within a video clip (e.g., a video game clip) being identified. The video game clips may include realistic motion that is orchestrated by a human, or otherwise programmed. The virtual objects that are in motion may be identified across multiple frames of the video clip and the movement of those virtual objects may be learned by the motion model(s). The virtual objects from which the motion models may be trained may include one or more parameters, such as a parameter associated with the real-life weight of the object corresponding to the virtual object. In this way, the motion models are trained on realistic motion from video clips where programmers have already created realistic motion of virtual objects within a video game. These virtual objects may have associated with them parameters relating to a physical quality, which the motion models can use to train. These parameters may pertain to the virtual weight of the virtual object, the virtual fragility of the virtual object, the virtual deformation to force of the virtual object, etc.

While labeled video clips may be obtained from clips of the same video game, unlabeled video clips may also be used to train the motion models. Unlabeled video clips may be from any suitable source, such as television, streaming media, video clips from social media, personally recorded video clips, etc. The unlabeled video clips, in some examples, may need to be labeled prior to use in training the motion model(s). The unlabeled video clips may be labeled, by indicating different objects, such as by a human or an automated system, within the video clip. Additionally, the objects within the video clip may be labeled with one or more parameters, such as a parameter associated with the real-life weight of one or more object(s) within the video clip. As with video game clips from the same video game, video clips from other sources may be used to train the motion model(s) of the trajectory of movement of various objects, so that the models can be used to determine the virtual trajectory of virtual objects within video games.

The motion models may be any suitable model, such as any variety of machine learning and/or artificial intelligence models. For example, the motion models may include convolution neural network (CNN) models and/or other neural network models. The motion models may include other models, such as decision tree models, gaussian tree models, Bernoulli models, random forest models, linear regression models, Bayesian network models, any variety of heuristics (e.g., genetic algorithms, swarm algorithms, etc.), combinations thereof, or the like. Outputs from the motion models may provide indications of virtual trajectories of virtual objects within video games.

According to examples of the disclosure, the training of the motion models may use any suitable mechanism, such as unsupervised training, supervised training, and/or mixed (e.g., supervised and unsupervised) training. In some cases, labeled training video clips may be used in unsupervised training of a CNN model or other type of machine learning model. In other cases, unlabeled training video clips may be used for supervised training of a CNN model or other type of machine learning model. In yet other cases, both unlabeled and labeled training video clips may be used for any of supervised, unsupervised, and/or mixed training.

In examples of the disclosure, a model generation system may generate and/or otherwise train the motion models for a variety of video games. Different video games may generally have separate motion models, as the context of the game may be important in mapping virtual objects and virtual actions within the video game. Thus, a motion model for a football video game may not be specifically tuned to robustly depict motion in a life simulation video game. Rather, game-specific motion models may be used for more robust and accurate learning from in-context video clips for particular video games. However, as an alternative, the disclosure also contemplates a unified motion model that may be used across a variety of video games. Such a unified motion model may, in some cases, identify a context of a video clip when generating virtual trajectory of objects and/or characters within a video game.

The model generation system may be used to generate the motion models for a variety of video games and then the motion models may be deployed within the video games to be executed by the platform on which the video game is hosted, such as the client system and/or the online gaming system(s). In some examples, the motion model may be updated by the model generation system for a particular video game. The motion models may be updated, for example, to be more robust by training on additional training video clips, to incorporate new capabilities of the video game (e.g., new virtual objects and/or virtual actions available in the video game), to correct for any recurring motion defects experienced in the field, or for any other suitable reasons. In some cases, updated motion models may be made available to players, via their player accounts, by distributing those updated motion models via any suitable mechanism, such as update packs and/or a software update via the Internet.

Although examples in the realm of video games and online gaming are discussed herein, it should be understood that the contact point and/or contact magnitude based virtual action selection, as described herein, may be applied to any variety of virtual interactions. Indeed, without providing an exhaustive list of applications, the contact point and contact intensity mechanism may be applied to any suitable type of virtual and/or interactive experience, video editing, computer generated graphics/video, virtual and/or augmented reality, video calling, etc. Similarly, the parameter based realistic virtual motion depiction may be applied to a similar set of varied applications. For example, the technologies disclosed herein may be used for the purposes of performing a virtual medical surgery in a virtual setting and in an interactive manner to enable training surgeons in similar types of surgeries.

It should be understood that the systems and methods, as discussed herein, are technological improvements in the field of virtual realistic actions and/or video gaming. For example, the methods and systems as disclosed herein enables computing resources to improve video and/or online gaming for players, via their player accounts, by enabling a more realistic determination of virtual actions and a more realistic display of virtual motion within a video game. These improvements manifest in players experiencing improved enjoyment and improved engagement with video games. Indeed, the disclosure herein provides improvements in the functioning of computers to provide improvements in the technical field of video and online gaming and the depiction of real-world actions in a virtual setting. Machine learning and artificial intelligence (AI)-based processes are disclosed that can provide realistic virtual motion generation. This type of action determination and realistic display capability may not be possible with traditional mechanisms of human based game play of a particular video game. Furthermore, the mechanisms and systems discussed herein, provide interaction within a virtual environment, where a player can choose actions based on virtual contact on different spots and/or magnitude of touch with a virtual object. Additionally, the technological problems addressed here are ones that arise in the computer-era and the Internet-era, such as in the fields of video and/or online gaming. Thus, not only is the disclosure directed to improvements in computing technology, but also to a variety of other technical fields related to video gaming, such as virtual reality, augmented reality, etc.

Certain implementations and examples of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the examples, as described herein. Like numbers refer to like elements throughout.

FIG. 1 illustrates a schematic diagram of an example environment 100 with client system(s) 104, online gaming system(s) 110, and/or model generation system(s) 130 to enable virtual object motion within a video game, in accordance with examples of the disclosure. The example environment 100 may include one or more player(s) 102(1), 102(2), . . . 102(N), hereinafter referred to individually or collectively as player 102 or player(s) 102, who may interact with respective client device(s) 104(1), 104(2), . . . 104(N), hereinafter referred to individually or collectively as client device 104 or client device(s) 104. The one or more player(s) 102 may interact with the one or more other elements of the environment 100 via corresponding respective player accounts. It should be understood that, as used herein, the player 102 can refer to (i) a person playing or participating in a video game; (ii) systems or devices corresponding to, associated with, operated by and/or managed by a player; and/or (iii) accounts and/or other data or collections of data associated with or corresponding to a player.

The client devices 104 may be configured to render content associated with the video game and/or online game to respective players 102. This content may include video, audio, haptic, combinations thereof, or the like content components. In some cases, the client device(s) 104 may host the video game locally, where the respective player 102 interacts with their client device 104 locally to play the video game. In other cases, the video game may be hosted online by the online gaming system 110 and a player 102 may use their client device 104 to interact with the video game, as hosted on the online gaming system 110.

In the online gaming case, the client device(s) 104 may receive game state information from the one or more online gaming system(s) 110 that may host the online game played by the player(s) 102 of environment 100. The receiving of game state information and/or game parameters may be via one or more application program interfaces (APIs) of the online game being hosted by the online gaming systems 110. The client device(s) 104 may use the game state information to render current events (e.g., audio and video) of the online game as content. The game state information may be received by the client device(s) 104 repeatedly and/or continuously and/or as events of the online game transpire. The game state information may be based at least in part on the interactions that each of the player(s) 102 have via their client device(s) 104 responsive to events of the online game hosted by the game system(s) 110.

As events transpire in the online game, the game system(s) 110 may update game state information and send that game state information to the client device(s) 104. The client device(s) 104 may accept input from respective players 102 via respective input device(s) (e.g., joysticks, touchscreens, etc.) (not shown). For example, if the players 102 are playing an online soccer game, and the player 102 playing one of the goalies move in a particular direction, then that movement and/or goalie location may be represented in the game state information that may be sent, such as via the APIs, to each of the client device(s) 104 for rendering the event of the goalie moving in the particular direction. In this way, the content of the online game is repeatedly updated throughout game play. When the game client device(s) 104 receive the game state information from the game system(s) 110, the game client device(s) 104 may render updated content associated with the online game to its respective player 102. This updated content may embody events that may have transpired since the previous state of the game (e.g., the movement of the goalie).

The client device(s) 104 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 104 may execute programs thereon to host the video game and/or interact with the online gaming system(s) 110 to render game content based at least in part on game state information received from the online gaming system(s) 110. Additionally, the client device(s) 104 may receive indications of player input (e.g., player intended actions) and host the video game appropriately when played in a local fashion. When the video game is played online, the client device 104 may send indications of player inputs to the online gaming system(s) 110. Game state information and player input information and/or parameters may be shared between the game client device(s) 104 and the game system(s) 110 using APIs.

The game system(s) 110 may receive inputs (e.g., parameters representative of player inputs) from various players 102 via API calls to the APIs and update the state of the online game based thereon. As the state of the online game is updated, the state information and/or updates may be sent the various client system(s) 104 for rendering online game content to players 102. In this way, the game system(s) 110 host the online game.

According to the disclosure herein, the client device 104 and/or the online gaming system 110 may be configured to receive contact inputs 112 that cause a player controlled virtual object (e.g., a character, and avatar, a human controlled animal, etc.) to contact another virtual object, which may or may not be controlled by a player. In other words, the contact input 112 is like any other player input via their input device (e.g., joystick, mouse, touchscreen, etc.), except it is an input that causes contact between two virtual objects within the video game.

The online gaming system(s) 110 and/or the client device 104 may determine, based at least in part on the contact input 112, a virtual action to be performed. In some cases, features of the contact input 112 may be analyzed to determine the resultant virtual action. In some cases, one or more motion models 114 may be used to analyze the contact input 112. In other cases, the online gaming system(s) 110 and/or the client device 104 may determine a virtual action without the use of the motion model(s) 114. In other words, in some cases, the motion model(s) may be used only for identifying a virtual action corresponding to the contact input 112, and in other cases, the motion model(s) may only be used for displaying realistic virtual motion in the video game, and yet other cases, the motion model(s) 114 may be used for both determining the virtual action based at least in part on the contact input 112 and the resultant realistic virtual motion. In the latter scenario, different motion models 114 may be used for analyzing the contact input 112 and for generating realistic virtual motion.

In some cases, individual virtual objects in the video game/online game may include properties that indicate a virtual action to be performed based at least in part on the contact input 112. Features of the contact input that may be used to identify the virtual action may be a contact point and/or a contact intensity 116 of the contact input 112. The online gaming system 110 and/or the client device 104 may determine the contact point and contact intensity 116 from the contact input 112. In some cases, this process may involve a motion model 114 and in other cases, the contact input 112 qualities of contact point and contact intensity 116 may be determined without the motion models 114.

The online gaming system(s) 110 and/or client device 104 may further be configured to use the motion models 114 to determine point-to-point movement 118 or trajectory of virtual objects within the video game. In some cases, the point-to-point movement 118 to be determined and depicted within the video game may be part of the virtual action determined based at least in part on the contact point and contact intensity 116 of the contact input. In other cases, the point-to-point movement 118 to be determined and depicted within the video game may be independent of player inputs. In other words, in some cases, the virtual action determination process may operate independent of the realistic motion process, and in other cases, the two processes may be linked.

A non-limiting example of the virtual action determination and realistic motion process may be considered in a hockey video game (e.g., NHL 19 by ELECTRONIC ARTS). A player 102, via their player account, may play the video game either locally on their own client device 104 or online via the online gaming system(s) 110. The player may provide a contact input 112 of the player's avatar's virtual hockey stick contacting a virtual puck. At this point, the client device 104 or the online gaming system(s) 110, depending on where the game is being hosted, may determine the contact point and contact intensity 116 associated with the contact between the virtual hockey stick and the virtual puck. The resultant virtual action may be one of a virtual puck control, virtual pass shot, or a virtual slap shot, depending on the magnitude of the contact input 112 (e.g., the contact intensity). For example, if the magnitude is less than a first threshold, then the virtual action may be determined to be a virtual puck control. If the magnitude is greater than the first threshold, but less than a second threshold, then the virtual action may be a virtual pass shot. Finally, if the magnitude is greater than the second threshold, then the virtual action may be a virtual slap shot. Additionally, the point of contact between the virtual hockey stick and the virtual puck may be considered in the direction of movement of the virtual puck for any of the various virtual actions. In this way, the contact point and contact intensity 116 of the contact input 112 is considered in the virtual action to be performed in the video game.

Continuing with the previous example of the virtual hockey stick and the virtual puck, regardless of the virtual action to be performed, the depiction of the virtual action may be relatively realistic, according to the systems and methods disclosed herein. The client device 104 and/or the online gaming system(s) 110 may invoke the appropriate motion model 114 to determine the trajectory of the virtual puck and/or the follow-through movement of the virtual hockey stick. The motion model 114 may consider one or more parameters associated with the virtual puck, such as a parameter related to a weight of a real-world puck, or a parameter related to the dynamic coefficient of friction between a puck and the ice of a hockey rink, to determine the trajectory of the virtual puck as part of the determined virtual action. The motion model 114 may determine the point-to-point movement 118 of the virtual puck, such as by way of tracing the virtual puck's trajectory with a defined start point, one or more waypoints, and an end point. The motion model 114 may further define one or more physical attributes of motion between each of the start/way/end points of the trajectory, such as speed or acceleration. Thus, the point-to-point movement 118 of the virtual puck may be rendered in the video game by the client device 104 and/or the online gaming system(s) 110.

In some cases, the online gaming system(s) 110 may host a variety of games for a variety of online players 102. In this case, the online gaming system(s) 110 may have access to a motion model datastore 120 where a variety of motion models 114 may be stored for a variety of video games. The online gaming system(s) 110 may access a corresponding motion model 114 for a game that it is hosting from the motion model datastore 120. In some examples, the online gaming system(s) 110 may be configured to provide to the client device(s) 104 new and/or updated motion models 114 from the motion model datastore 120.

The environment 100 may further include one or more model generation system(s) 130 that are configured to generate and/or update motion models 114. In some cases, the model generation system(s) 130 may generate various motion models 114 corresponding to various respective video games. The model generation system(s) 130 may train the motion model 114 using any variety of training data 132, such as labeled and/or unlabeled training videos. The model generation system(s) 130 may also update motion models 114, such as when new training data 132 is available, when issues with a particular motion model 114 is identified, when new capabilities (e.g., new virtual objects and/or virtual actions) are added to the associated video games, etc. The model generation system(s) 130, in some cases, may further be configured to receive and/or scrape training data 132, such as training video clips, from a variety of sources, such as social media and/or streaming services. The model generation system(s) 130 may still further be configured to provide new and/or updated motion models 114 to the online gaming system(s) 110 and/or the client device(s) 104.

The motion models 114 may be any suitable model, such as any variety of machine learning and/or artificial intelligence models. For example, the motion models may include convolution neural network (CNN) models and/or other neural network models. The motion models 114 may include other models, such as decision tree models, gaussian tree models, Bernoulli models, random forest models, linear regression models, Bayesian network models, any variety of heuristics (e.g., genetic algorithms, swarm algorithms, etc.), combinations thereof, or the like. Outputs from the motion models 114 may provide indications of objects, actions, and/or parameters defining the aforementioned objects and/or actions in a video clip.

Figure 2:
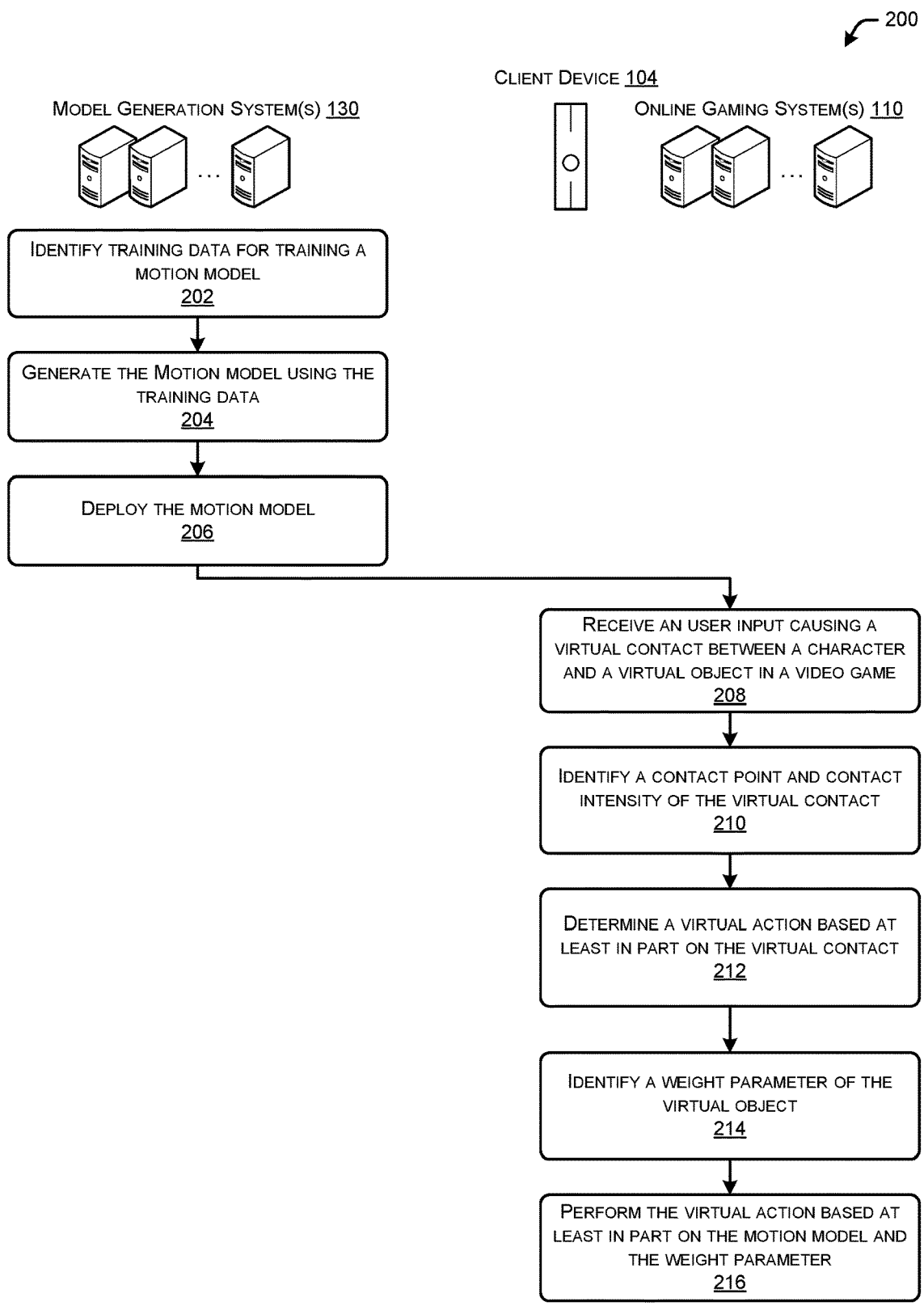
FIG. 2 illustrates a flow diagram of an example method by which a virtual action with a virtual object in motion is identified and/or displayed in a video game, in accordance with examples of the disclosure.

FIG. 2 illustrates a flow diagram of an example method by which a virtual action with a virtual object in motion is identified and/or displayed in a video game, in accordance with examples of the disclosure. Method 200 may be performed by a combination of the model generations system(s) 130 and either the client device 104 or the online gaming system(s) 110, individually or in cooperation with other elements of environment 100.

At block 202, the model generating system 130 may identify training data for training a motion model 114. As discussed herein, the training data 132 may include any suitable training data, such as labeled video clips, unlabeled video clips, or a combination of the aforementioned. In some cases, the training data may be video game clips that are already labeled due to the video game clips being generated by the video game itself. Thus, using video game clips as training data allows for a low-resource mechanism for obtaining labeled training data that can then be used for training motion models 114. In other words, the video game clips, by virtue of being generated by the video game, are already labeled, and therefore, are high-quality training data 132 for training the motion models on mapping objects and actions in video clips to virtual objects and virtual actions in the video game. The training data 132 may, in some cases, further include other labeled data, such as video clips that are partially or fully labeled by humans or by bots, and/or unlabeled data, such as video clips where objects and/or actions are not identified and/or labeled. The labeled video clips have already been programmed in a manner where object movement is realistic. The training data is to also include one or more parameters, such as a parameter related to the virtual weight of the corresponding virtual object, to which the motion models 114 can be trained.

At block 204, the model generation system 130 may generate the motion model using the training data. The motion models 114 may be any suitable model, such as any variety of machine learning and/or artificial intelligence models. For example, the motion models may include convolution neural network (CNN) models and/or other neural network models. The motion models 114 may include other models, such as decision tree models, gaussian tree models, Bernoulli models, random forest models, linear regression models, Bayesian network models, any variety of heuristics (e.g., genetic algorithms, swarm algorithms, etc.), combinations thereof, or the like. The training process may involve any suitable process, such as video segmentation, to analyze the training data 132, such as labeled video clips and/or unlabeled video clips. For example, spatial segmentation techniques may be used to identify objects within the training video lips, such as video game clips. Additionally, temporal or across frame segmentation may be used to identify movement and/or actions of objects identified in the training video clips. A variety of image processing and/or video processing techniques may be used to identify objects and/or actions within the training data 132 video clips, such as edge detection, motion detection, etc. Any combination of unsupervised, supervised, or bother unsupervised and supervised training may be used to generate the motion model 114.

At block 206, the model generation system 130 may deploy the motion model 114. Deployment may involve providing the motion model 114 to the client device 104 and/or the online gaming system 110 where the motion models may be used to determine virtual object trajectories associated with virtual objects involved in virtual actions within the video game. In some cases, the deployment of the motion model 114 may involve including the motion model 114 in media sold to players 102 when players purchase a video game at a store. Alternatively, the deployment of the motion model 114 may involve sending the motion model 114 to the client device 104 and/or the online gaming system 110, such as via the Internet. In the case where the video game is hosted by the online gaming system 110 and where the online gaming system 110 generates the in-game trajectories associated with virtual actions, the motion model 114 may be provided by the model generation system 130 to the online gaming system 110.

At block 208, client device 104 and/or the online gaming system 110 may receive a user input (e.g., a contact input 112) causing a virtual contact between a character and a virtual object in a video game. At this point, the client device 104 and/or the online gaming system 110 may already have the motion model 114. Thus, the contact input 112 may be analyzed by the client device 104 and/or the online gaming system 110 to cause subsequent virtual actions to occur in the video game.

At block 210, the client device 104 and/or the online gaming system 110 may identify the contact point and/or the contact intensity 116 of the virtual contact. This process may involve analyzing the time and contact location of the character relative to the virtual object. For example, the client device 104 and/or the online gaming system 110 may examine whether the character touched the front of a virtual couch, where the character may sit, or the back of the virtual couch, where the character would not be able to sit. In this way, all contact inputs 112 between the character and the virtual object are not treated as a generic touch that prompts the same virtual action. Rather, where on the virtual object the character makes contact may prompt different virtual actions within the video game. Additionally, the contact intensity may be determined by comparing the magnitude of the virtual contact force, as determined by the contact input 112, to one or more threshold levels. Different virtual actions may be prompted by different magnitudes of the virtual contact force. It should be noted that in some cases, only the point of contact on a virtual object may be considered for the purposes of determining a subsequent virtual action in the video game. In other cases, only the magnitude or intensity of contact on the virtual object may be considered for the purposes of determining the subsequent virtual action in the video game. In yet other cases, both the magnitude or intensity of contact, as well as the point of contact on the virtual object may be considered for the purposes of determining the subsequent virtual action in the video game.

At block 212, the client device 104 and/or the online gaming system 110 may determine a virtual action based at least in part on the virtual contact. The virtual action may be determined based at least in part on the contact point and/or contact intensity determined between the character and the virtual object. The virtual object may have associated with it one or more indicators of virtual actions that are to be prompted as a function of touch point and/or touch intensity. For example, a virtual couch may have encoded, such as with metadata, that a virtual contact on its cushion side would result in a virtual sitting action, while touching the virtual couch on the backside may result in a virtual toe stubbing action. Thus, the client device 140 and/or the online gaming system 110 may compare the contact point and/or contact intensity 116 to one or more conditional elements associated with the virtual object to determine the resulting virtual action from the contact input 112.

At block 214, the client device 104 and/or the online gaming system 110 may identify a weight parameter of the virtual object. The weight parameter may, in some cases, represent the weight of a real-life object corresponding to the virtual object in the video game. For example, the weight parameter of a virtual dog in the video game may be the weight of a similar sized dog in real life. The weight parameter can then be used by the client device 104 and/or the online gaming system 110 to determine a virtual trajectory of movement of the virtual object and/or the avatar, as resulting from the contact input 112.

It should be understood that in some examples, there may be other parameters instead of or in addition to a weight parameter. Like the weight parameter, other possible parameters associated with a virtual object may represent physical characteristics of a corresponding real-life object. For example, a virtual object may have associated with it a fragility parameter representing the fragility of a corresponding real-life object, a deformation parameter representing the deformation to force of the corresponding real-life object, a roughness parameter representing the surface roughness of the corresponding real-life object, and/or any suitable parameter corresponding to a physical feature of a real-life object corresponding to the virtual object.

It should be understood that the one or more parameters associate with a virtual object is considered by the motion models 114 to generate realistic movement of one or more of the virtual objects (e.g., the avatar, the virtual object with which the avatar makes contact, etc.). For example, the motion model 114 may provide a different virtual trajectory for lifting a heavy object by the avatar, compared to the avatar lifting a lighter object. Similarly, an avatar may pick up a virtual object with a relatively high level of deformation (e.g., a puppy that droops down when picked up) much differently, compared to an object with relatively little deformation (e.g., a rigid dinner plate).

At block 216, the client device 104 and/or the online gaming system 110 may perform the virtual action based at least in part on the motion model 114 and the weight parameter. As disclosed herein, the motion model may 114 consider one or more parameters, such as the weight parameter, to determine the virtual trajectory of one or more virtual objects in performing the virtual action within the video game. As disclosed herein, the virtual action to be performed may involve the virtual motion of more than one object and/or more than one part of an object (e.g., the torso and the legs of an avatar that is to lie down on a bed).

The virtual motion may be defined by the motion model 114 as a series of points through which the moving virtual object passes, thus defining the virtual spatial trajectory of the virtual object. For example, the series of points may include a start point, where the virtual object starts the motion to perform the virtual action, an end point, where the virtual action concludes, and one or more waypoints between the star point and the end point, to provide more spatial precision to the virtual trajectory.

The virtual trajectory, as generated using the motion model 114, may also define one or more physical motion qualities and/or parameters along the virtual trajectory of the virtual motion of the virtual object. For example, these physical motion parameters may be defined at or between the various start point, waypoint(s), and/or end point. The physical parameters may include, for example, speed, acceleration, transit time, or the like, at or between the various points that define the virtual trajectory. In this way, the virtual trajectory can be segmented with different speed and/or acceleration within different segments of the virtual trajectory. This type of segmentation and definition of the parameters of the virtual trajectory may lead to improved display that is more realistic than conventional depictions of movement in video games.

It should be understood that the virtual action and the constituent virtual motion with motion model 114 derived virtual trajectory may be depicted across a number of display frames of the video game. In other words, the virtual motion of a virtual object within the video game takes time to transpire and is depicted over a plurality of frames of display within the video game. For example, if the video game display is at a rate of 30 frames per second, a three second movement of within the video game may be depicted over 90 frames of display within the video game. It will be appreciated that varying rates of movement of the virtual object within the frames of the video game may make the virtual motion more realistic.

It should further be noted that the realistic aspect of the virtual motion, as described herein, is substantially automated. Thus, the improved realism of the virtual motion, according to this disclosure, may not involve substantial human intervention and/or choreography. Conventional mechanisms of achieving realistic motion within video games may involve a human programmer choreographing the movement of virtual objects within the video game. This process can be time consuming and may involve a limitless number of virtual objects, making the realistic motion very expensive and/or unachievable for all or most of the virtual objects within the video game. Furthermore, user defined virtual objects, such as new virtual objects that a player may create within the video game may not have realistic motion associated therewith, when using conventional techniques of defining virtual motion. However, with the mechanisms disclosed herein, any virtual object's motion may be determined based at lest in part on one or a limited set of parameters (e.g., weight parameter, displacement parameter, fragility parameter, etc.) of the virtual object. Based on these parameter(s) associated with the virtual object, and using the motion model 114, the client device 104 and/or the online gaming system 110 can provide the virtual trajectory of virtual objects in a automated and/or dynamic way.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
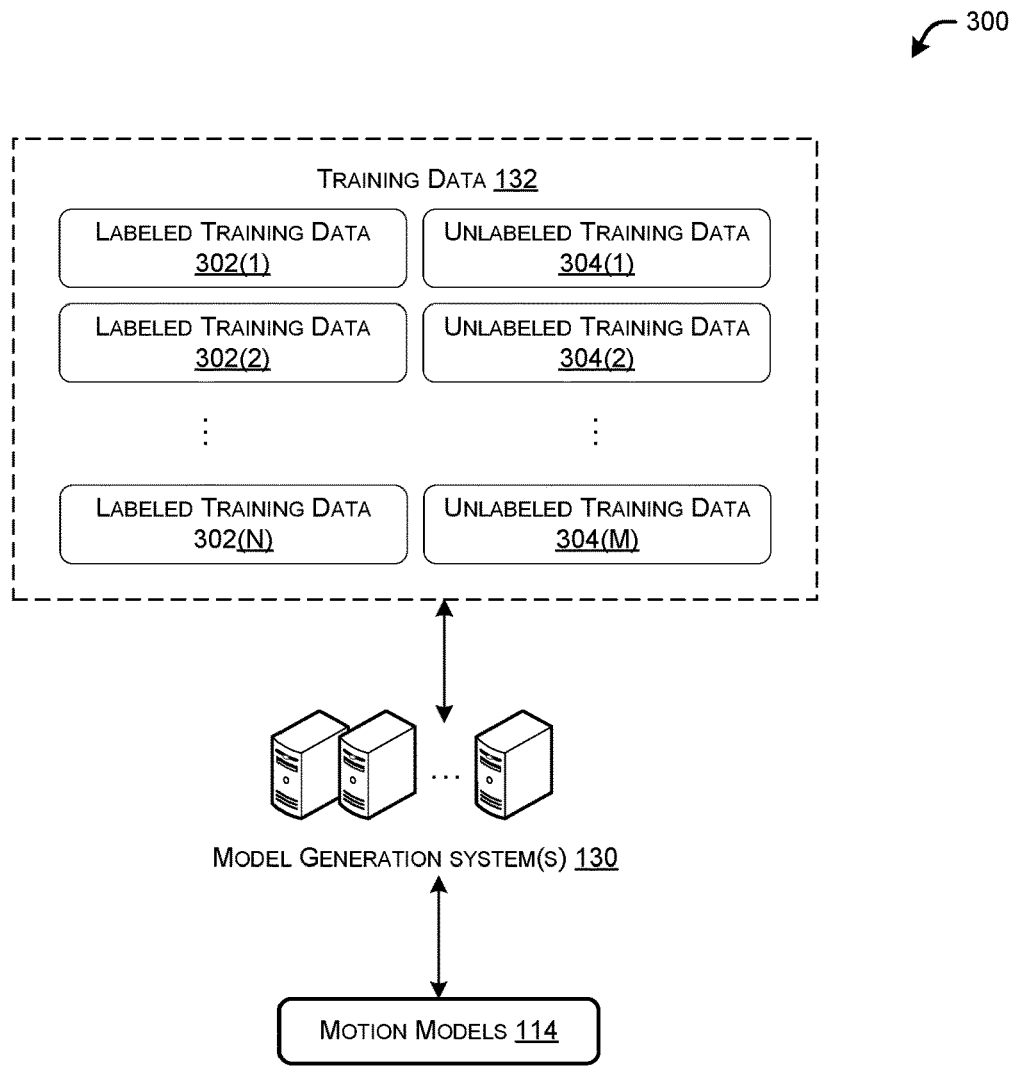
FIG. 3 illustrates an example environment where the model generation system(s) of FIG. 1 uses training data to generate motion model(s), in accordance with examples of the disclosure.

FIG. 3 illustrates an example environment where the model generation system(s) of FIG. 1 uses training data to generate motion model(s), in accordance with examples of the disclosure. It should be noted that in some cases, the model generation system(s) 130 may be distributed systems and/or part of other systems, such as part of the online gaming system 110.

To generate motion models 114, the various models may be trained using the training data 132 as received by and/or generated by the model generation system(s) 130. The training data 132 may include one or more labeled training data 302(1), 302(2), . . . , 302(N), hereinafter referred to, individually or in plurality, as labeled training data 302. The training data 132 may further include unlabeled training data 304(1), 304(2), . . . , 304(M), hereinafter referred to, individually or in plurality, as unlabeled training data 304.

The training data 132 may be gathered in any suitable manner. In examples, the labeled training data 302 may include clips of video game play of the same video game for which the motion model 114 is to be trained. Since, in this case, the video game clips are from the same video game for which the motion model 114 is generated, the video game clips are already labeled with the assets (e.g., virtual objects and/or virtual actions) of the video game. Thus, by using pre-labeled video game clips as labeled training data 302 in training the motion model 114, resources that would otherwise be used for labeling training video clips may not be needed. For example, manual labeling of the video game clips may not be needed, as the video game clips are already labeled with virtual objects available in the video game, as well as virtual actions that can be performed in the video game.

In some cases, the labeled training data 302 may have one or more parameters associated with each virtual object. These parameters may be the same parameters that would be used by the trained and deployed motion model(s) 114 to generate the virtual trajectory for a virtual object during video game play. For example, individual ones of the virtual objects within the labeled training data 302 may be tagged with, or otherwise associated with, a weight parameter. As discussed herein, the weight parameter may represent the weight of a real-world object corresponding to the virtual object. For example, the video game may have a virtual cooking pan and a similar real-world cooking pan may weigh 3 pounds. In this case, the virtual cooking pan within the video game may have a weight parameter that is 3 pounds, or some other equivalent representation of that weight.

In some examples, there may be any number of other parameters, in addition to or instead of the weight parameter. For example, other parameters may include a surface texture parameter, a roughness parameter, a deformation parameter, a fragility parameter. Each of the aforementioned parameters may associate a real-world quality to the virtual objects, where those real-world qualities may affect the way those virtual objects may be moved. For example, a fragile object (e.g., a crystal wine glass) may generally be handled more gently than a less fragile object (e.g., a bag of rice). Regardless of the number of parameters and/or the exact type of parameters associated with the virtual objects of the video game, the motion models 114 may train using the labeled training data 302 in a manner such that virtual trajectories can be determined based on the associated parameters.

In some cases, other training video clips may be used as unlabeled data 304 for training the motion model 114 for a particular video game. These video clips may be obtained from any suitable location, such as a streaming service and/or social media. These video clips, in some cases, may be video game clips that people upload to one or more social media sites. Generally, these video game clips may not be labeled, meaning virtual objects and/or virtual actions may not be identified in these video game clips. In some cases, the unlabeled video game clips may be labeled, such as by a human and/or an automated mechanism. In other words, a human or an automated system (e.g., a bot) may identify and label virtual objects and/or virtual actions within the unlabeled training data 304. The unlabeled training data 304 may further be associated with one or more parameters (e.g., a weight parameter), similar to the case for labeled training data, for training the motion models 114 with respect to those parameters. In some cases, the video game clips, when labeled may be used for training the motion model 114. In other cases, video clips, including video game clips, television broadcast clips, social media video clips, etc. that are unlabeled may be used for training the motion model 114. In yet other cases, both labeled training data 302 and unlabeled training data 304 may be used to train the motion model 114.

The motion models 114 may be any suitable model, such as any variety of machine learning and/or artificial intelligence models. For example, motion models 114 may include a CNN model, other types of neural network model, decision tree model, a gaussian tree model, a Bernoulli model, and a random forest model, linear regression models, Bayesian network models, any variety of heuristics (e.g., genetic algorithms, swarm algorithms, etc.), combinations thereof, or the like.

These model generation system(s) 130 may be configured to train the motion models 114, as described herein. This training may be supervised, unsupervised, or partially supervised (e.g., semi-supervised). This training may include fitting the outcome labeled training data 302 of the training data 132 to virtual objects and/or virtual actions, as labeled within the labeled training data 302. In examples, the model generation system(s) 130 may wait to train the motion models 114 until a sufficient amount of the training data 132 is available. It should be appreciated that more accurate and robust motion models 114 may be generated by using a larger corpus of training data 132.

In some cases, once the motion models 114 are generated using the training data 132, the motion models 114 may be tested. This testing, in some cases, may be performed on a portion of the training data 132 or other training data 132 that had not been used to train the motion models 114. The performance of the motion model 114 in correctly mapping objects and actions to virtual objects and virtual actions in the video game may be assessed prior to deploying the motion model 114.

In some cases, the motion model 114 may be a combination of more than one machine learning model. As a non-limiting example, there may be four models used for generating the virtual trajectories: a CNN, a decision tree model, a Bernoulli model, and a random forest model. These models may be generated by training each of these models using training data 132. The models may then be tested against additional training data 132 to determine their performance. It may be found that the CNN model performs the best, followed by the decision tree model, then the Bernoulli model, and finally the random forest model. In this case, the output of the CNN model may be weighted at 50%, the decision tree model at 25%, the Bernoulli model at 15%, and the gaussian tree model at 10%. This is an example weighting, and in some cases the weights selected for the motion models 114 may be proportional to their relative performance in determining the virtual motion of a virtual object.

Figure 4:
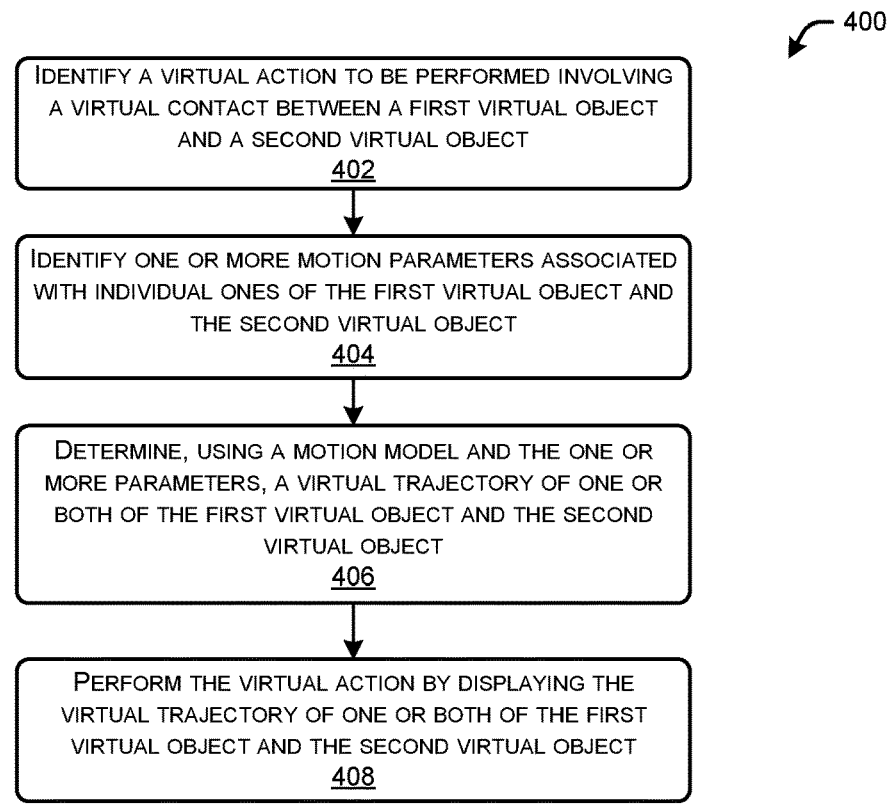
FIG. 4 illustrates a flow diagram of an example method for performing a virtual action, in accordance with examples of the disclosure.

FIG. 4 illustrates a flow diagram of an example method for performing a virtual action, in accordance with examples of the disclosure. The method 400 may be performed by the client devices 104 and/or the online gaming system(s) 110, individually or in cooperation with one or more other elements of the environment 100. The method 400 may be an example process for the operations of block 216 of method 200 of FIG. 2.

At block 402, the client device 104 and/or the online gaming system(s) 110 may identify a virtual action to be performed involving a virtual contact between a first virtual object and a second virtual object. The player 102 may provide contact input 112 via their input device to prompt the determination of the virtual action to be performed. As disclosed herein, the client device 104 and/or online gaming system 110 may consider the contact point and/or contact intensity 116 to determine the virtual action to be performed. In some cases, the one of the first virtual object or the second virtual object may be an avatar or character controlled by the player 102 playing the video game. In other cases, the first virtual object and the second virtual object may be controlled by two different players 102. In yet other example cases, neither the first virtual object nor the second virtual object may be controlled by a player. In this latter case, the virtual objects may represent non-playing characters (NPCs) or other inanimate virtual objects that contact each other.

At block 404, the client device 104 and/or the online gaming system(s) 110 may identify one or more parameters associated with individual ones of the first virtual object and the second virtual object. As disclosed herein, the parameter(s) associated with one or both of the first virtual object and the second virtual object may be representative of a physical characteristic of a real-world analog of the first virtual object or the second virtual object. As discussed above, the parameters may represent the weight of one or both of the virtual objects. In some cases, the parameter(s) from one of the first virtual object or the second virtual object may be used to determine the virtual motion and/or the virtual trajectory of either or both of the virtual objects. In other cases, parameter(s) associated with both of the two virtual objects may be used for the purposes of determining the virtual trajectory of one or both of the virtual objects.

At block 406, the client device 104 and/or the online gaming system(s) 110 may determine, using a motion model 114 and the one or more parameters, a virtual trajectory of one or both of the first virtual object and the second virtual object. As discussed herein, the motion model 114 may provide a defined virtual trajectory that segments, both spatially and/or temporally, of either or both of the virtual objects. In some cases, there may be multiple parts of one or more of the virtual objects that have a virtual trajectory defined therefor. As disclosed herein, in some cases, the virtual trajectory may be defined as a series of points (start, way, and/or end) through which one or more of the virtual objects, or a portion thereof, may pass. In some cases, movement-oriented parameters (e.g., speed parameter, acceleration parameter, etc.) may be determined at or between the start/way/end points of the virtual trajectory.

At block 408, the client device 104 and/or the online gaming system(s) 110 may perform the virtual action by displaying the virtual trajectory of one or both of the first virtual object and the second virtual object. The virtual motion of one or both of the virtual objects within the video game takes time to transpire and is depicted over a plurality of frames of display within the video game. For example, if the video game display is at a rate of 25 frames per second, a two second movement of within the video game may be depicted over 50 frames of display within the video game. It will be appreciated that varying rates of movement of the virtual object(s) within the frames of the video game may make the virtual motion more realistic.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
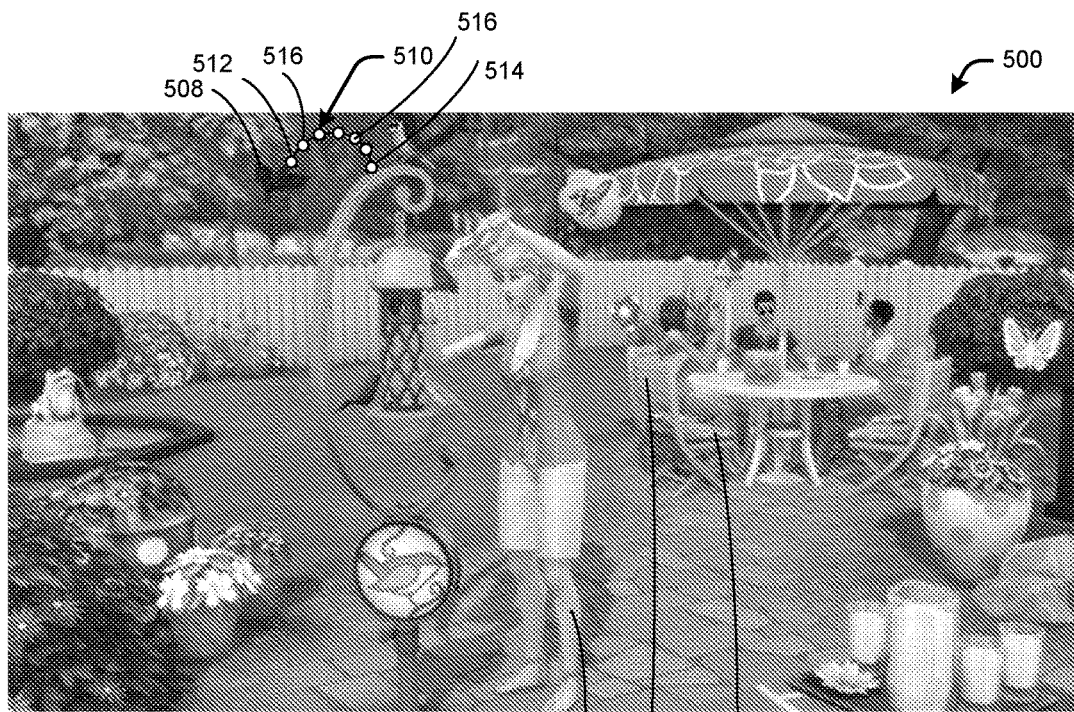
FIG. 5 are example screen captures from video games that illustrate virtual action identification and/or virtual motion, in accordance with examples of the disclosure.
Figure 5:

FIG. 5 are example screen captures 500, 520 from video games that illustrate virtual action identification and/or virtual motion, in accordance with examples of the disclosure. These screen captures 500, 520 are from a simulation game, but it should be understood that the techniques of virtual action determination and/or realistic motion can be applied to any variety of video games, simulations, training tools, virtual reality, augmented reality, etc.

Screen capture 500 depicts a first virtual object as an avatar 502 that is controlled by a player 102 via their player account. The avatar 502 my go touch a back of a chair 504 to move the chair or touch a seat of the chair 504 to sit down. In this way, where the avatar 502 touches the virtual object determines which virtual action is to be performed in the life simulation video game. The avatar 502, being controlled by the player 102 through their player account, responds to contact input 112 to cause the virtual action (e.g., sitting down or moving the chair).

In the screen capture 500 there may be a non-player controlled (NPC) virtual object, in the form of a virtual bird 508. This virtual bird 508 may fly to a virtual post and land on the virtual post. The virtual trajectory 510 of the virtual bird 508 may be determined using a motion model 114 corresponding to this video game. As shown, the virtual trajectory 510 may include a start point 512, an end point 514, and multiple waypoints 516, spatially defining the virtual trajectory 510. In this way, the path of the virtual bird 508 may realistically mimic the path of a bird in real life. The motion model 114 may also provide speed of the virtual bird along its virtual trajectory 510. For example, the motion model may provide the speed of the virtual bird 508 along each of the waypoints 516. Although the virtual trajectory 510 of the virtual bird 508 is depicted in a single frame of the video game display, it should be understood that the movement of the virtual bird will be displayed over a plurality of consecutive frames of the video game display.

In screen capture 520, there may be a player-controlled avatar 522, holding a virtual cup 524. The player 102, via their player account, may provide inputs that cause the avatar 522 to place the cup 524 down on a table. The motion model 114 may determine a start point 526, an end point 528, and one or more waypoints 530, 532 of the cup 524 movement, to be depicted multiple frames of the video game. The movement defined by the start point 526, the end point 528, and the one or more waypoints 530, 532 may define a realistic movement of a cup being placed on a table in real life. Additionally, the motion model 114 may determine that the speed of the virtual cup 524 is to be slowed down at waypoint 532, so that the virtual cup 524 may be placed gently on the table.

Figure 6:
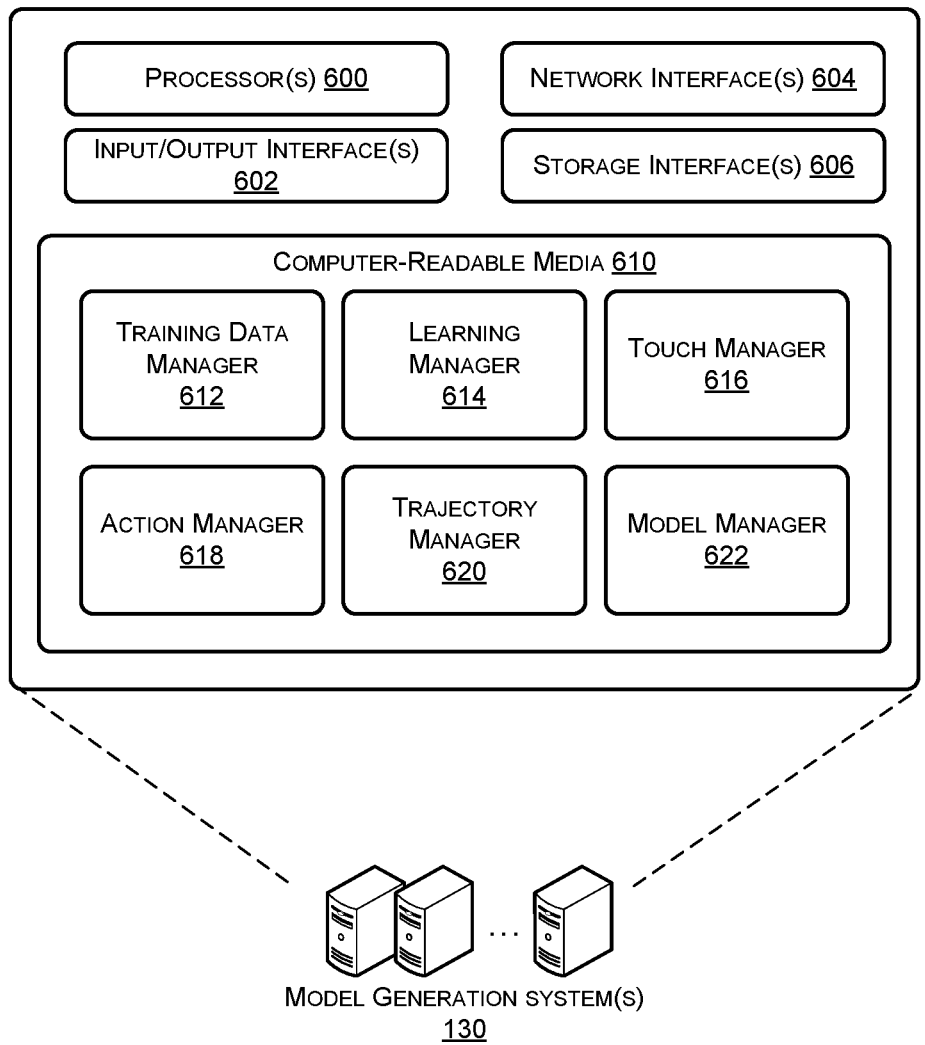
FIG. 6 illustrates a block diagram of example model generation system(s) that may generate motion models, in accordance with examples of the disclosure.
Figure 7:
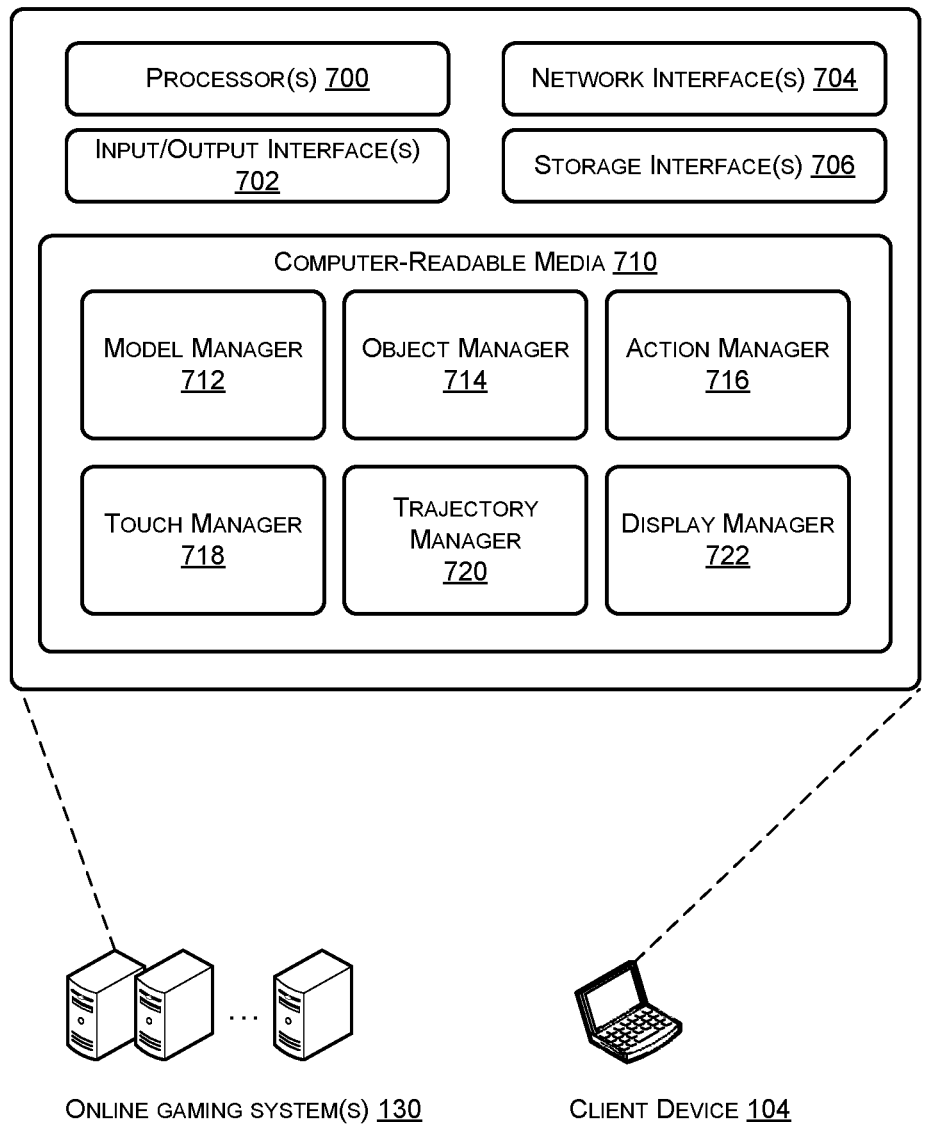
FIG. 7 illustrates a block diagram of example client system(s) and/or online gaming system(s) that may perform virtual action with realistic movement, in accordance with examples of the disclosure.

FIG. 6 illustrates a block diagram of example model generation system(s) 130 that may generate motion models, in accordance with examples of the disclosure. The model generation system(s) 130 may include one or more processor(s) 600, one or more input/output (I/O) interface(s) 602, one or more network interface(s) 604, one or more storage interface(s) 606, and computer-readable media 610.

In some implementations, the processors(s) 600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 600 may possess its own local memory, which also may store program modules, program data, and/or one or more operating system(s). The one or more processor(s) 600 may include one or more cores.

The one or more input/output (I/O) interface(s) 602 may enable the model generation system(s) 130 to detect interaction with a user and/or other system(s), such as the one or more game system(s) 110. The I/O interface(s) 602 may include a combination of hardware, software, and/or firmware and may include software drivers for enabling the operation of any variety of I/O device(s) integrated on the model generation system(s) 130 or with which the model generation system(s) 130 interacts, such as displays, microphones, speakers, cameras, switches, and any other variety of sensors, or the like.

The network interface(s) 604 may enable the model generation system(s) 130 to communicate via the one or more network(s). The network interface(s) 604 may include a combination of hardware, software, and/or firmware and may include software drivers for enabling any variety of protocol-based communications, and any variety of wireline and/or wireless ports/antennas. For example, the network interface(s) 604 may comprise one or more of a cellular radio, a wireless (e.g., IEEE 802.1x-based) interface, a Bluetooth® interface, and the like. In some examples, the network interface(s) 604 may include radio frequency (RF) circuitry that allows the model generation system(s) 130 to transition between various standards. The network interface(s) 604 may further enable the model generation system(s) 130 to communicate over circuit-switch domains and/or packet-switch domains.

The storage interface(s) 606 may enable the processor(s) 600 to interface and exchange data with the computer-readable medium 610, as well as any storage device(s) external to the model generation system(s) 130, such as any datastore storing training data 132.

The computer-readable media 610 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 610 may be implemented as computer-readable storage media (CRSM), which may be any available physical media accessible by the processor(s) 600 to execute instructions stored on the memory 610. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 600. The computer-readable media 610 may have an operating system (OS) and/or a variety of suitable applications stored thereon. The OS, when executed by the processor(s) 600 may enable management of hardware and/or software resources of the model generation system(s) 130.

Several functional blocks having instruction, data stores, and so forth may be stored within the computer-readable media 610 and configured to execute on the processor(s) 600. The computer readable media 610 may have stored thereon a training data manager 612, an learning manager 614, a touch manager 616, an action manager 618, a trajectory manager 620, and a model manager 622. It will be appreciated that each of the functional blocks 612, 614, 616, 618, 620, 622, may have instructions stored thereon that when executed by the processor(s) 600 may enable various functions pertaining to the operations of the model generation system(s) 130.

The instructions stored in the training data manager 612, when executed by the processor(s) 600, may configure the model generation system(s) 130 to receive and/or store training data 132, such as video game clips. The processor(s) 600 may organize, store, and/or queue the training data 132 when needed for training the motion models 114. The training data 132 may include one or both of labeled and/or unlabeled training data. In some cases, the processor(s) 600 may facilitate labeling of unlabeled training data 304, such as by a human and/or a bot.

The instructions stored in the learning manager 614, when executed by the processor(s) 600, may configure the model generation system(s) 130 to use training data 132, to generate the motion models 114. The processor(s) 502 may organize, store, and/or queue the unlabeled training data 304 when needed for training the motion models 114. As discussed herein, the motion model 114 may include a CNN, other neural network models, a regression model, or any other suitable machine learning model. In some cases, the motion model 114 may include a combination of different machine learning models. In these cases, the processor(s) 600 may train a number of different machine learning models and combine them to generate the motion model 114.

The instructions stored in the touch manager 616, when executed by the processor(s) 600, may configure the model generation system(s) 130 to identify a contact input 112 and determine a contact point and contact intensity of the contact input to determine the resultant virtual action.

The instructions stored in the action manager 618, when executed by the processor(s) 600, may configure the model generation system(s) 130 to determine a virtual action to be performed. This virtual action may correspond to a determined contact point and/or contact intensity of a contact input.

The instructions stored in the trajectory manager 620, when executed by the processor(s) 600, may configure the model generation system(s) 130 to map virtual objects and/or virtual actions in the training data 132 to their constituent motion in performing the virtual action. The virtual motion may further be used to find a correlation to one or more parameters corresponding to one or more virtual objects involved in the virtual action, as depicted in training data 132. Thus, the correspondence between the parameters of the virtual objects involved and the resultant virtual actions may be learned by the model generation system(s) 130 to provide motion model(s) 114.

The instructions stored in the model manager 622, when executed by the processor(s) 600, may configure the model generation system(s) 130 to generate the motion models 114 for a variety of video games and deploy those models to other suitable entities, such as the client device 104 and/or online gaming system(s) 110. In some cases, the processor(s) 600 update motion models 114 and manage their storage, versions, and/or updates/deployment.

FIG. 6 illustrates a block diagram of example client device(s) 104 and/or online gaming system(s) 110 that may interactively reenact a video clip in a video game, in accordance with examples of the disclosure. The example client system(s) 104 and/or the online gaming system(s) 110 may include one or more processor(s) 700, one or more I/O interface(s) 702, one or more network interface(s) 704, one or more storage interface(s) 706, and computer-readable media 710. The description of the one or more processor(s) 700, the one or more I/O interface(s) 702, the one or more network interface(s) 704, the one or more storage interface(s) 706, and the computer-readable media 710 may be substantially similar to the descriptions of the one or more processor(s) 600, the one or more I/O interface(s) 602, the one or more network interface(s) 604, the one or more storage interface(s) 606, and the computer-readable media 610, respectively, and in the interest of brevity, is not be repeated here.

Several functional blocks having instruction, data stores, and so forth may be stored within the computer-readable media 710 and configured to execute on the processor(s) 700. The computer readable media 710 may have stored thereon a model manager 712, an object manager 714, an action manager 716, a touch manager 718, a trajectory manager 720, and a display manager 722. It will be appreciated that each of the functional blocks 712, 714, 716, 718, 720, 722, may have instructions stored thereon that when executed by the processor(s) 700 may enable various functions pertaining to the operations of the client device(s) 104 and/or online gaming system(s) 110.

The instructions stored in the model manager 712, when executed by the processor(s) 700, may configure the client device(s) 104 and/or online gaming system(s) 110 to store, manage, and/or control updates to the motion model(s) 114. These motion model(s) 114 may be stored and managed and used to generate realistic virtual motion within one or more different video games by the client device(s) 104 and/or online gaming system(s) 110.

The instructions stored in the object manager 714, when executed by the processor(s) 700, may configure the client device(s) 104 and/or online gaming system(s) 110 to identify and/or manage one or more parameters associated with any variety of virtual objects within the video game. These virtual object attributes (e.g., a weight parameter, a fragility parameter, etc.) may be used, in conjunction with a corresponding motion model 114, to provide realistic motion of virtual objects within the video game.

The instructions stored in the action manager 716, when executed by the processor(s) 700, may configure the client device(s) 104 and/or online gaming system(s) 110 to determine a virtual action to be performed within the video game. The processor(s) 700 may identify contact point and/or contact intensity 116 information about a contact input 112 and determine a virtual action to perform based thereon.

The instructions stored in the touch manager 718, when executed by the processor(s) 700, may configure the client device(s) 104 and/or online gaming system(s) 110 to identify contact point and/or contact intensity 116 information about a contact input 112. This information can subsequently be used to identify a virtual action that is to be performed during video game play.

The instructions stored in the trajectory manager 720, when executed by the processor(s) 700, may configure the client device(s) 104 and/or online gaming system(s) 110 to invoke a corresponding motion model 114 to determine a virtual trajectory to depict within video game play, where the virtual trajectory corresponds to a virtual action that is to be performed. The client device(s) 104 and/or online gaming system(s) 110 may generate the virtual trajectory as a series of spatial points (e.g., start point, waypoint(s), and/or end point) of one or more virtual objects and/or portions thereof involved in the virtual action. The virtual trajectory may further define one or more movement parameters (e.g., speed, acceleration, etc.) associated with the one or more segments of the virtual trajectory.

The instructions stored in the display manager 722, when executed by the processor(s) 700, may configure the client device(s) 104 and/or online gaming system(s) 110 to depict a virtual action in a realistic manner. The client device(s) 104 and/or online gaming system(s) 110 may display the movement of one or more virtual objects within the video game according to the virtual action to be performed and/or any determined virtual trajectory of those virtual actions. The virtual action may be depicted over multiple frames of display, as the virtual action will transpire over a period of time.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some examples of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A system, comprising:
one or more processors; and
one or more computer-readable media storing computer-executable instructions that, when executed by the one or more processors, cause the one or more processors to:
identify a contact input associated with a player account, wherein the player account is used to play a video game;
determine, based at least in part on the contact input, a virtual action to be performed with a first virtual object within the video game;
determine, based at least in part on a motion model and the virtual action to be performed, a virtual trajectory associated with the first virtual object, wherein the motion model is trained using video game clips associated with the video game; and
display, over a plurality of frames associated with the video game, virtual movement of the first virtual object according to the virtual trajectory.

2. The system of claim 1, wherein the computer-executable instructions further cause the one or more processors to:
determine at least one of: (i) a contact point between an avatar and the first virtual object; or (ii) a contact intensity between the avatar and the first virtual object, where in the virtual action is based at least in part on at least one of the contact point or the contact intensity.

3. The system of claim 1, wherein the computer-executable instructions further cause the one or more processors to:
determine, based at least in part on the motion model and the virtual action to be performed, a second virtual trajectory associated with a second virtual object; and
display, over the plurality of frames associated with the video game, a second virtual movement of the second virtual object according to the second virtual trajectory.

4. The system of claim 1, wherein the computer-executable instructions further cause the one or more processors to:
identify a second contact input associated with a second player account, where the second player account is used to play the video game;
determine, based at least in part on the second contact input, a second virtual action to be performed with a second virtual object within the video game;
determine, based at least in part on the motion model and the second virtual action to be performed, a second virtual trajectory associated with the second virtual object; and
display, over a second plurality of frames associated with the video game, a second virtual movement of the second virtual object according to the second virtual trajectory.

5. The system of claim 1, wherein to determine the virtual trajectory associated with the first virtual object, the computer-executable instructions further cause the one or more processors to:
determine a start point associated with the virtual trajectory;

determine an end point associated with the virtual trajectory; and determine at least one waypoint between the start point and the end point.

6. The system of claim 5, wherein the virtual trajectory includes an indication of a speed between a first waypoint and a second waypoint.

7. The system of claim 1, wherein the computer-executable instructions further cause the one or more processors to:

identify a parameter associated with the first virtual object, wherein the virtual trajectory is based at least in part on the parameter.

8. The system of claim 7, wherein the parameter is associated with at least one of: (i) a virtual weight of the first virtual object; (ii) a virtual fragility of the first virtual object; or (iii) a virtual deformation of the first virtual object.

9. A method, comprising:

determining, by one or more processors, a virtual action to be performed within a video game, the virtual action associated with a first virtual object and a second virtual object;

identifying, by the one or more processors, a motion model associated with the video game;

identifying, by the one or more processors, a parameter associated with the first virtual object;

determining, by the one or more processors and based at least in part on the motion model and the parameter, a virtual trajectory associated with the first virtual object; and displaying, by the one or more processors and over a plurality of frames associated with the video game, virtual movement of the first virtual object according to the virtual trajectory.

10. The method of claim 9, further comprising:

identifying, by the one or more processors, a second parameter associated with the second virtual object;

determining, by the one or more processors and based at least in part on the motion model and the second parameter, a second virtual trajectory associated with the second virtual object; and displaying, by the one or more processors and over the plurality of frames associated with the video game, a second virtual movement of the second virtual object according to the second virtual trajectory.

11. The method of claim 10, wherein the virtual movement of the first virtual object is based at least in part on the second parameter.

12. The method of claim 9, further comprising:

identifying, by the one or more processors, a contact input associated with a player account, the contact input causing contact between the first virtual object and the second virtual object.

13. The method of claim 12, further comprising:

determining, by the one or more processors, at least one of: (i) a contact point between the first virtual object and the second virtual object; or (ii) a contact intensity between the first virtual object and the second virtual object, where in the virtual action is based at least in part on at least one of the contact point or the contact intensity.

14. The method of claim 9, wherein the virtual trajectory includes at least one of a start point, an end point, and a plurality of waypoints spatially between the start point and the end point.

15. The method of claim 14, wherein the virtual trajectory includes an indication of a speed between a first waypoint and a second waypoint.

16. A system, comprising:

one or more processors; and one or more computer-readable media storing computer-executable instructions that, when executed by the one or more processors, cause the one or more processors to:

identify a contact input associated with a player account, wherein the player account is used to play a video game;

determine at least one of: (i) a contact point between first virtual object and a second virtual object; or (ii) a contact intensity between the first virtual object and the second virtual object;

determine, using a motion model, a virtual action based at least in part on at least one of the contact point or the contact intensity, wherein the motion model is trained using video game clips associated with the video game; and display, over a plurality of frames associated with the video game, the virtual action.

17. The system of claim 16, wherein the computer-executable instructions further cause the one or more processors to:

identify the motion model associated with the video game;

identify a parameter associated with the first virtual object; and determine, based at least in part on the motion model and the parameter, a virtual trajectory associated with the first virtual object, wherein to display the virtual action comprises displaying movement of the first virtual object according to the virtual trajectory.

18. The system of claim 17, wherein the virtual trajectory includes at least one of a start point, an end point, and a plurality of waypoints spatially between the start point and the end point.

19. The system of claim 17, wherein the motion model includes a convolution neural network (CNN) model.

20. The system of claim 16, wherein the computer-executable instructions further cause the one or more processors to:

determine, based at least in part on the motion model and the virtual action to be performed, a second virtual trajectory associated with the second virtual object; and display, over the plurality of frames associated with the video game, a second virtual movement of the second virtual object according to the second virtual trajectory.

* * * * *